Sept. 26, 1950  O. M. SORENSEN  2,523,925
TRAWL NET SLED

Filed May 12, 1949  2 Sheets-Sheet 1

Oscar M. Sorensen
INVENTOR.

BY *[signatures]*
Attorneys

Sept. 26, 1950     O. M. SORENSEN     2,523,925
TRAWL NET SLED
Filed May 12, 1949                            2 Sheets-Sheet 2
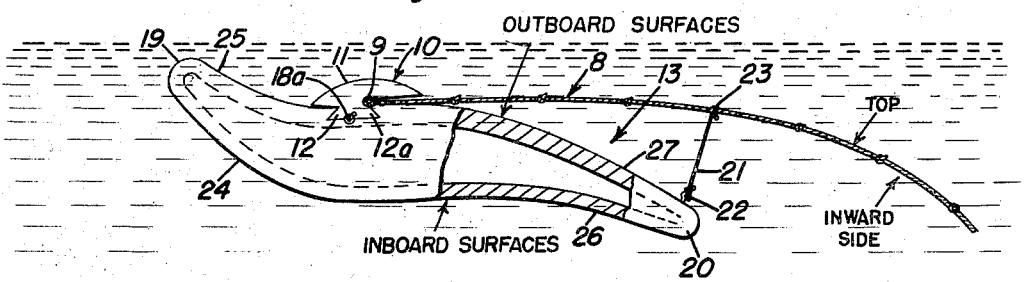
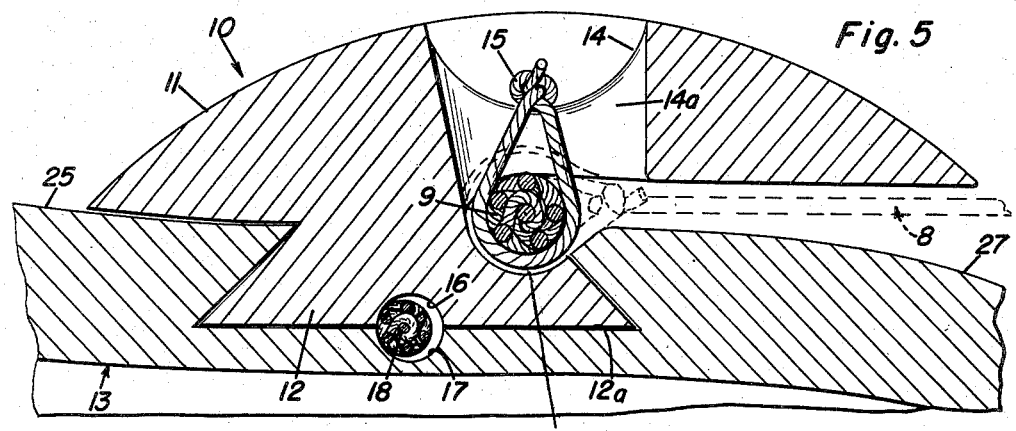
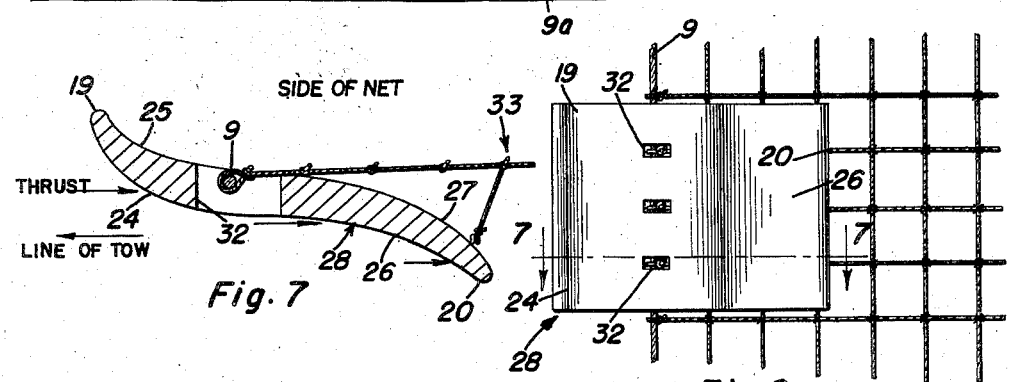
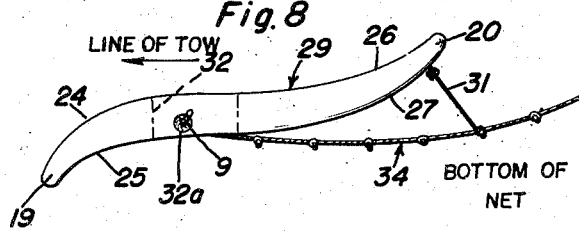
Oscar M. Sorensen
INVENTOR.

Patented Sept. 26, 1950

2,523,925

UNITED STATES PATENT OFFICE 2,523,925

TRAWL NET SLED

Oscar M. Sorensen, Fernandina, Fla.

Application May 12, 1949, Serial No. 92,843

4 Claims. (Cl. 43—9)

The present invention relates to novel sleds which are adapted to be directly attached to the leading edges of a sock-type, flat or other form of trawl net to satisfactorily spread and maintain the mouth of the net open as the latter is dragged and thus drawn through the water by suitably powered boats or the like. More specifically, the invention pertains to a plurality of correspondingly shaped sleds which are circumferentially spaced about the mouth of the net and are pivotally attached intermediate their fore and aft ends thereto so that top, bottom, and sides of said net are effectively distended and so that the net may be reliably maneuvered, clear of the bottom of the body of water, at high, low and intermediate planes to achieve the results wanted.

Another object of the invention is to provide properly constructed and coordinated sleds which, when applied to a trawl net in accordance with the requirements of this invention, provide an assemblage in which users will find their needs fully met, contained and conveniently available.

A further object of the invention is to employ an assemblage of sleds of suitable sizes and materials and to utilize hollow, buoyant sleds for floating the upper or top portion of the net, and solid and heavier sleds for the side and bottom portions of the net in order that the sleds, in a combined manner, serve to hold the mouth of the net well open and ready for the catch at all times.

A still further object of the invention is to provide sleds which may be either permanently or detachably mounted on the net to best meet the requirements of all fishermen.

For those who prefer the readily applicable and detachable types, I provide adapters therefor which are permanently pivoted on the cork line of the net and which are constructed to permit complemental sleds to be readily keyed in place thereon and subsequently disconnected from said adapters.

More specifically, I am concerned with a self-adjusting and self-maneuvering trawl net sled of general rectangular shape in plan view whose intermediate transverse portion may be pivotally attached to the net with its outboard surface next to the net and so that the leading end defines a piloting head portion and projects beyond the net, and the trailing end defines a tail portion which functions, under ordinary circumstances within the area of the net, the inboard and outboard surfaces being reversely ogeed to present the desired convexities and concavities which enable the sled to bottle and traverse the line of two in desired otter-like fashion.

Then, too, novelty is predicated on the novel combination of a trawl net having the usual cork line at its open end, adapters pivotally attached to said cork line, and a selected number of substantially rectangular sleds which function to generate the necessary lifting and thrust actions to facilitate the towing of the trawl net substantially clear of the bottom of the body of water through which the net is being towed. These sleds are removably keyed intermediate their fore and aft ends to said adapters and the points of attachment are such that the sleds are self-balancing, each sled having a head with a rounded leading edge and inner and outer convexed surfaces respectively, and each sled also having a tail portion with coacting inner and outer concaved and convexed surfaces respectively, whereby each sled is hydro-dynamic in nature and thus serves to exert the desired directional and propelling forces against the mouth end of a net that the latter may be effectually towed.

Other objects and advantages will become more readily apparent from the following description and the accompanying illustrative drawing.

In the drawings:

Fig. 4 is a view showing a fragmentary portion of the top of the trawl net with a so-called top sled with the tail portion of the latter broken away and shown in section;

Fig. 5 is a fragmentary view, on an exaggerated scale, showing the manner in which the adapter is hinged and tied on the cork line and the manner in which it is keyed to the sled, this view being on the plane of the line 5—5 of Fig. 2, looking in the direction of the arrows;

Fig. 6 is a fragmentary side view observing the interior of a side portion of the same trawl net with a one piece solid-type sled, a modified form of sled, pivotally attached to the cork line.

Fig. 7 is a section on the line 7—7 of Fig. 6, and;

Fig. 8 is a side elevational view of a one-piece solid construction such as is used on the interior of the bottom of the net.

Figure 1:
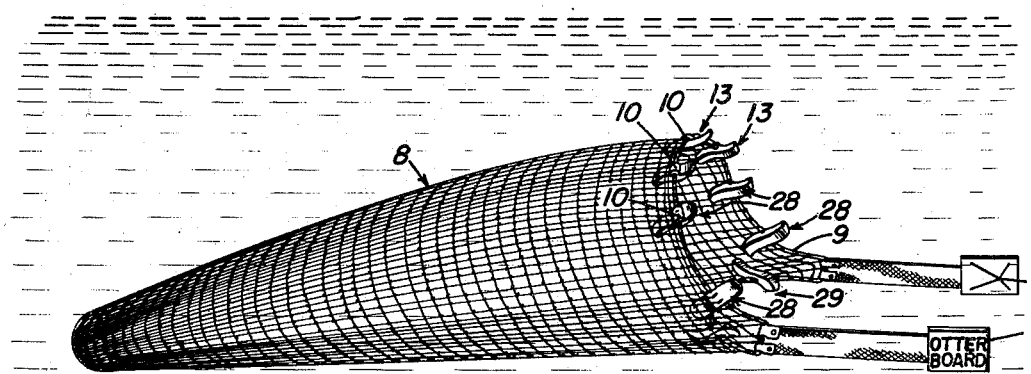
Fig. 1 is a perspective view of a balloon-type trawl net showing the usual cork line equipped with circumferentially spaced self-maneuvering towing and net spreading sleds constructed in accordance with the principles of the present invention.
Figure 2:
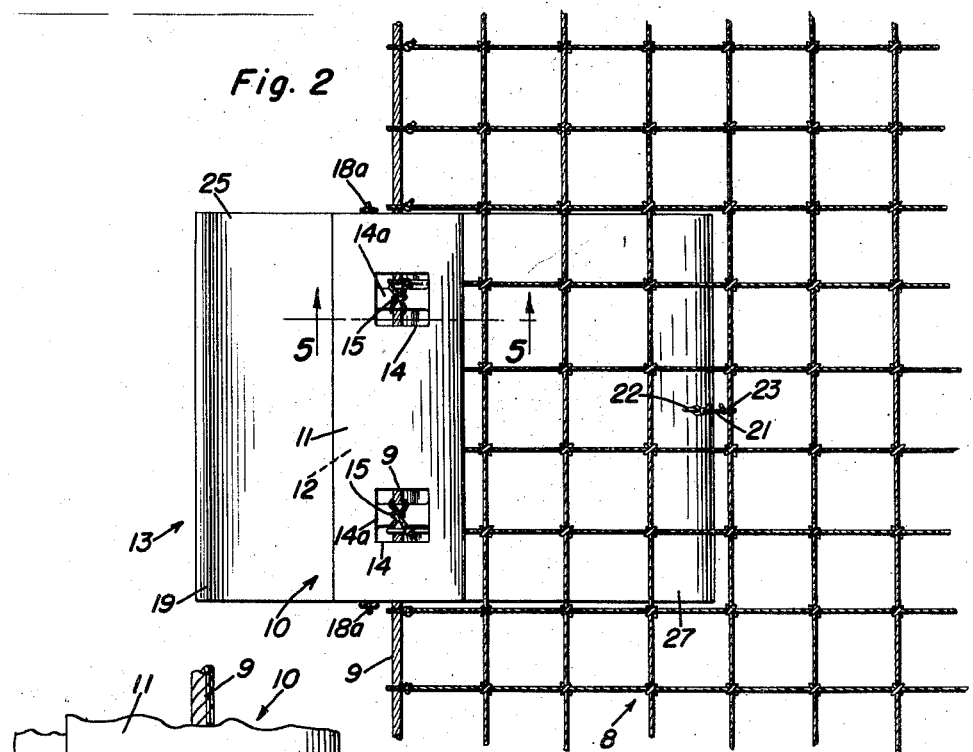
Fig. 2 is an enlarged fragmentary top plan view of the top of the net and one of the so-called top sleds.
Figure 3:
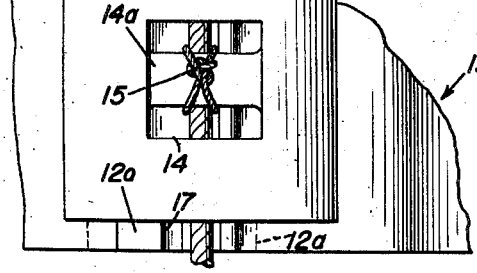
Fig. 3 is an enlarged fragmentary top plan view of the sled appearing in Fig. 2 illustrating the manner in which the sled proper is slid on and off of the complemental adapter.

Reference is made first to Figure 1 to 5, inclusive. The top portion of the net is denoted by the numeral 8 and the leading edge or so-called cork rope, the larger one, is denoted by the numeral 9, and it is to this rope that the block-like adapters 10 are pivotally and detachably connected. Each adapter, as best shown in Figure 3, comprises a convexed head portion 11 and a rib portion 12. The rib portion is here shown as dovetailed in cross-section and constitutes a keying rib and is adapted to fit removably in a corresponding shaped transverse keyway 12a in the intermediate outboard surface of the hydro-dynamic sled 13. The adapter has a longitudinal passage 9a therethrough for said rope 9 and is provided with longitudinally spaced accommodation openings 14' with bridge members 14a therein to accommodate tie cords 15 which serve to permanently lash the adapter 10 on said rope 9. Any number of adapters and sleds are employed to accommodate the so-called top portion or side 8 of the net.

The sled shown in these figures (see Fig. 4) is hollow and therefore constitutes a float. The keying rib 12 is provided centrally with a semi-circular groove 16 and a corresponding groove 17 is formed in the sled 13 and an assembling and fastening rope 18 is passed through the bore provided by these coacting grooves. The ends of the rope project beyond the ends of the bore and are knotted as at 18a, to thus "lock" the sled 13 on the adapter 10.

In these figures (see Figs. 2 to 5, inclusive), the outboard surface is the top, and the inboard surface the bottom. The leading end portion of the sled, which projects beyond the adapter, constitutes a head and the other half portion which projects into the net, on the trailing end, constitutes a tail. The head is denoted at 19 and the tail at 20. A tie cord 21 may, if desired, be used and one end connected at 22 to the tail and the other end connected at 23 to the net. These tie cords 21 keep the various sleds in place at the time the trawl net is thrown or cast overboard. Without such ties, the sleds would not necessarily take correct straight ahead positions for lifting and steering the mouth of the net. In fact, the sleds might, during the course of throwing the net overboard, tumble completely out of place. Therefore, the tie cords 21 are ever so important.

Considering the long S curves which are used to define the outboard and inboard surfaces of the rectangular sled, one may vision same as of ogee or elongated S-shaped form and these ogeed surfaces are in reverse order to each other. Thus, the desired recessions and cambers or, alternately, concavities and convexities, are provided. It will be noted, then, that the inboard or underneath surface of the head is convexed to provide the desired camber at the point 24 and to further provide, on the outboard or opposite side, a concavity 25. The concaved portion 26 of the tail is on the inboard side and the convexed camber 27 on the outboard side.

The net top supporting sleds 13 are preferably hollow and detachable as shown and described in Figure 4. The side and bottom sleds are heavier and of solid one-piece construction and in Figures 6 and 7 I show one of the side sleds 28 and in Figure 8 I show one of the bottom sleds 29. The shapes of these side and bottom sleds corresponds to the sleds 13 in reference to a head, tail and curvatures, and therefore the same reference numerals used in Figure 2 are employed here to designate "like" parts. Also, both of the sleds 28 and 29 are solid and the tail portions are restrained by tie cords 30 and 31, respectively, as shown in Figures 7 and 8. Then, too, each of the sleds shown in Figures 7 and 8 have slots at the intermediate portion, each slot being denoted at 32, provided with hole means 32a whereby the sleds may be permanently attached to the net portions 33 and 34, respectively.

It will be noticed in Figs. 4, 7 and 8 that the outward or head end portions of the sleds not only project beyond the cork line but actually toe outwardly whereas the inner or tail end portions, which are here shown on the inside of the net, toe inwardly. Also due to the elongated S-shaped configuration each trawl net sled is hydro-dynamic in nature and exerts its mouth opening force as the protruding head portion thrusts against the water during the movement of the sled equipped trawl net through the water. In many respects the curved surfaces of the sleds are comparable with air foils on certain types of airplane wings.

It will be clear that these sleds, when attached, will serve to make any type of net more flexible and adaptable to attain the ends wanted. They will make it possible to drag or draw the net at high, low and intermediate planes to make desired catches at the expected levels. These sleds prevent center collapse of the mouth of the net and insure that it will be properly distended and held open and they serve to eliminate objectionable "drag" when floats such as corks and the like are used.

I feel, too, that a trawl net sled constructed in accordance with my ideas will be easy to handle and will save time and labor. When in use, it provides for positive directional thrust action and results in the desired otter-like self-maneuverability of action.

The materials and sizes are, of course, of no particular moment, but it may be mentioned that these sleds have been made satisfactorily from aluminum and commercial plastics.

In view of the foregoing description taken in conjunction with the accoompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. In combination a trawl net, and a sled, the latter being substantially rectangular in plan view and of ogee shape in side view and having an intermediate portion pivotally connected to the leading edge of said net so that the leading end of said sled defines a head portion projecting beyond said net and the trailing end defines a tail portion substantially paralleling said net, said head portion having its upper surface concave and its lower surface convex, and said tail portion having its upper surface convex and its lower surface concave.

2. In combination, a trawl net, a cork line for said net, an adapter lashed on the cork line, said adapter having a keying rib, a sled, said sled having a groove opening through opposite longitudinal edge portions of the sled and constituting a keyway, said keying rib fitting removably in said keyway, whereby said sled is detachably mounted on said adapter, and a cord received within the adapter rib and sled for maintaining them in assembled relation.

3. In combination, a trawl net, a cork rope at the mouth of said net, an adapter lashed on the cork rope, said adapter including a keying rib, a sled, having a groove opening through opposite end portions and constituting a keyway for said keying rib, said keying rib having a groove and the keyway also having a groove and said grooves registering and providing an open ended passage, and a rope laced through said passage and having its ends knotted and serving to securely fasten said keying rib in said keyway.

4. In combination, a trawl net having a cork line at its mouth end, adapters pivotally attached to said cork line, sleds substantially rectangular in plan view, said adapter having a key for removably holding the adapter on the sled, said adapter and sled facilitating lifting and towing said trawl net substantially clear of the bottom of a body of water through which said net is being towed, said sleds being directly fastened intermediate their fore and aft ends to said adapters and being self-balancing, each sled having a head with a rounded leading edge and inner and outer convexed and concaved surfaces respectively, and also having a tail with coacting inner and outer concaved and convexed surfaces respectively, whereby each sled is hydrodynamic in nature and thus serves to exert lifting and spreading forces on the co-acting portion of the net, said adapters and sleds having aligned grooves in adjacent surfaces and a fastening rope within said grooves for maintaining the adapters and sleds in assembled relation.

OSCAR M. SORENSEN.

REFERENCES CITED

The following references are of record in the file of this patent:

UNITED STATES PATENTS

| Number | Name | Date |
| --- | --- | --- |
| 2,300,178 | Ross | Oct. 27, 1942 |

FOREIGN PATENTS

| Number | Country | Date |
| --- | --- | --- |
| 1,481 | Great Britain | 1885 |